Aug. 31, 1965    E. O. BLODGETT    3,204,051
ELECTRICAL SEQUENTIAL-CIRCUIT CONTROLLER
Filed Jan. 30, 1963    4 Sheets-Sheet 1
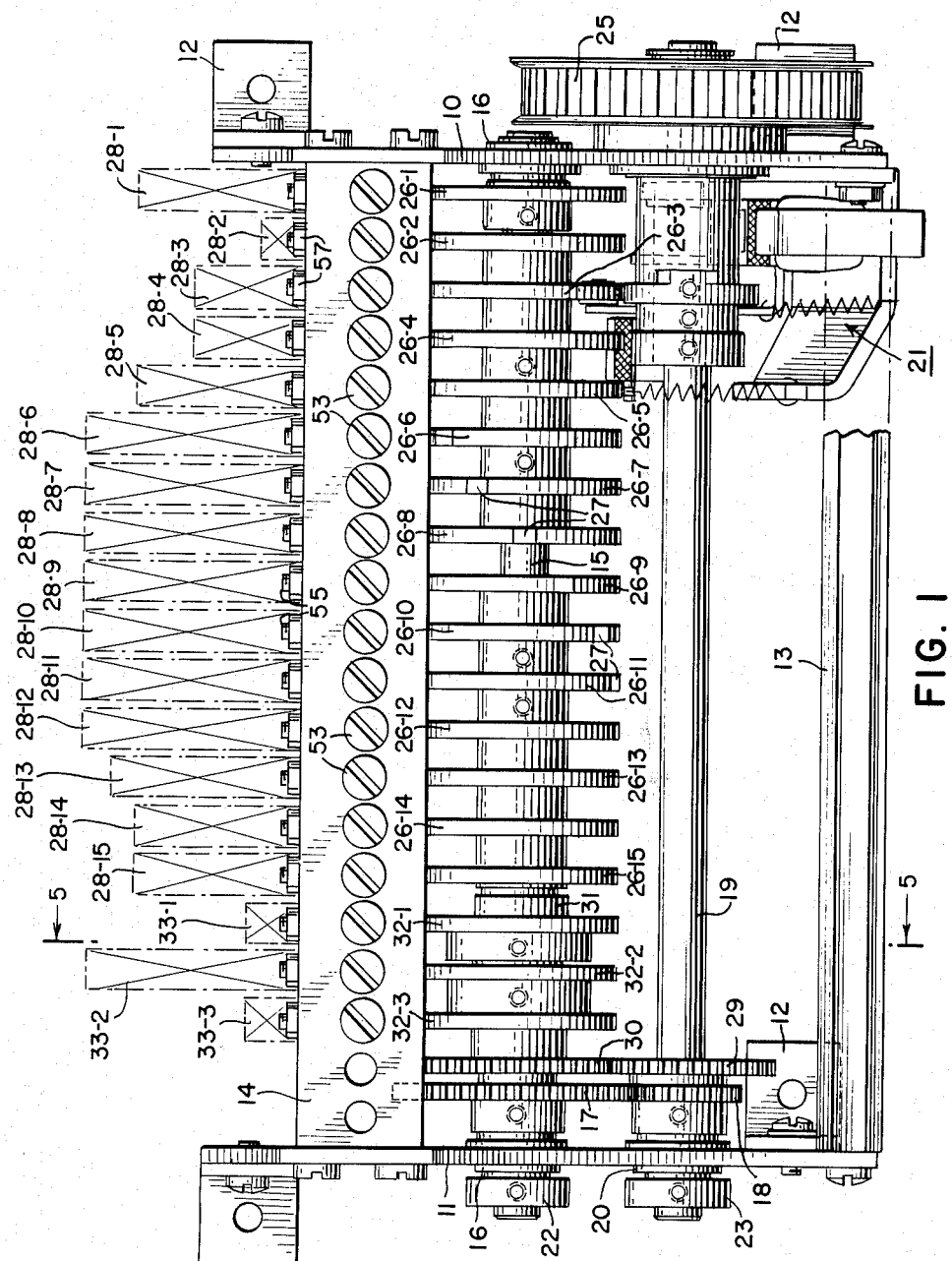
FIG. 1
INVENTOR.
EDWIN O. BLODGETT
BY 
ATTORNEY

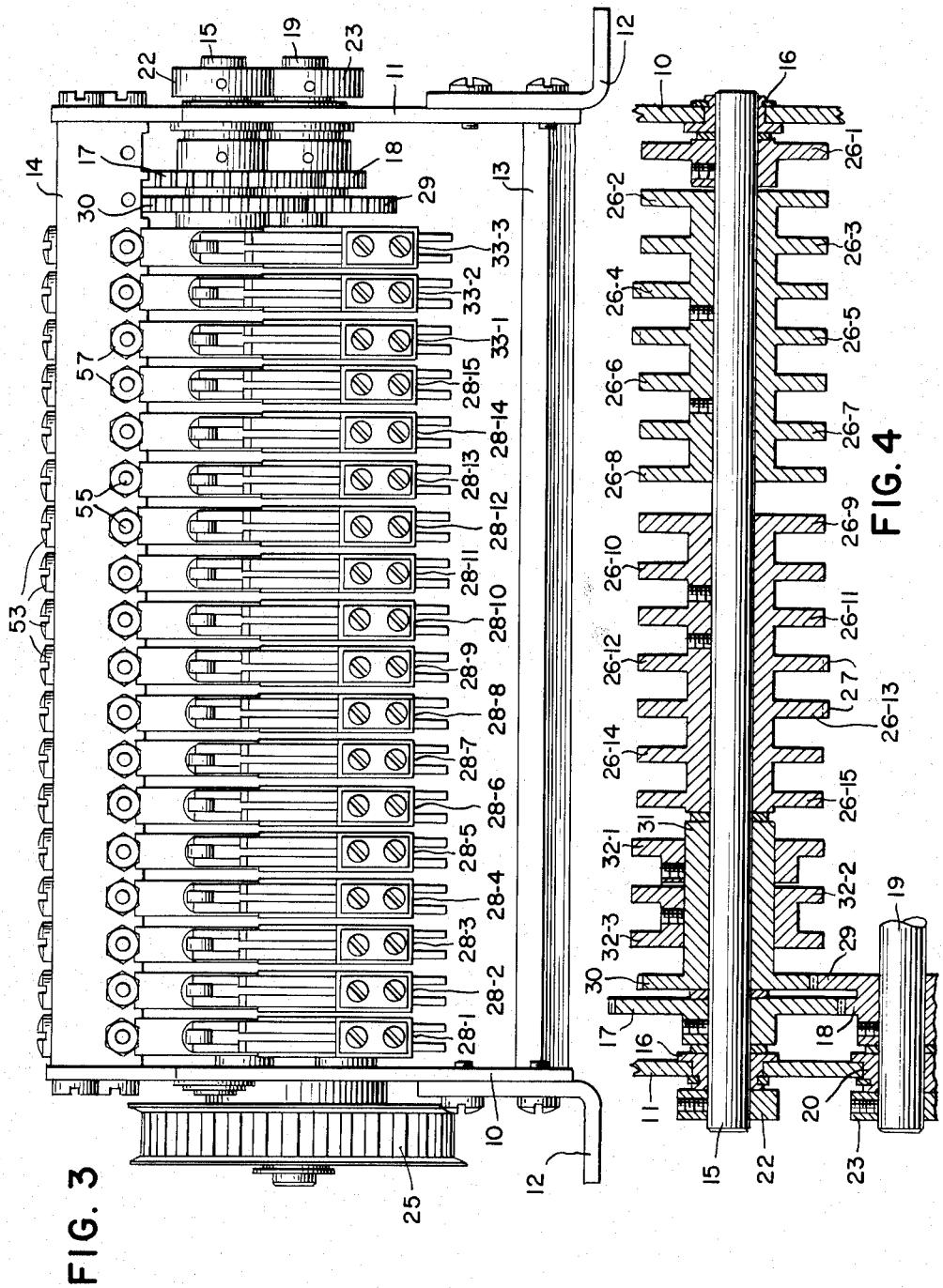

United States Patent Office 3,204,051
Patented Aug. 31, 1965

3,204,051
ELECTRICAL SEQUENTIAL-CIRCUIT CONTROLLER
Edwin O. Blodgett, Rochester, N.Y., assignor, by mesne assignments, to Friden, Inc., San Leandro, Calif., a corporation of Delaware
Filed Jan. 30, 1963, Ser. No. 254,990
10 Claims. (Cl. 200—38)

The present invention relates to electrical circuit control devices and, more particularly, to control devices for sequentially controlling individually or in preselected groups plural electrical circuits.

It is frequently desirable that plural electrical circuits be controlled in sequence either individually or in preselected groups or both individually with respect to certain circuits and by groups with respect to the remaining circuits. The desired form of control may be interruption or completion of electrical circuit continuity or both interruption of certain circuits and completion of others. Certain applications require the control device to provide a cyclic control action by which the sequential control is repetitive in nature yet capable of being initiated cycle by cycle at will.

Many forms of devices for sequential cyclic control of electrical circuits have heretofore been proposed, but these have usually employed some form of electronic sequential counter system using vacuum tubes or gas filled tubes or equivalent devices, some form of relay sequential counter system utilizing electrical relay devices, or some form of electrical commutator structure with cooperating electrical brushes and involving relative mechanical movement between the commutator and brushes. From the standpoint of consistently reliable operation over prolonged periods of unattended operation, mechanically operated control devices with their attendant ruggedness are often preferred. These as just noted, however, ordinarily are of the mechanically driven commutator type and often present substantial problems concerning not only the desired circuit commutation or sequential control but also matters of excessively rapid brush wear and undesirable brush arching which is especially prevalent when the control circuits have significant inherent inductance.

It is an object of the present invention to provide a new and improved electrical system sequential-circuit controller of the mechanically operated type and characterized by high precision of operational control and unusually high operational reliability over prolonged periods of operation.

It is a further object of the invention to provide a novel electrical system sequential-circuit controller which insures error-free sequential operation of multiple electrical circuits carrying appreciable values of current and having significant inherent inductance, and one which enables concise control with ease of relatively large numbers of circuits included in each of sequentially controlled multiple groups thereof.

Other objects and advantages of the invention will appear as the detailed description thereof proceeds in the light of the drawings forming a part of this application and in which:

FIG. 1 illustrates in plan view, FIG. 2 in an end elevational view, and FIG. 3 in rear elevational view, the construction of an electrical circuit control device embodying the present invention in a particular form:

FIG. 4 is a longitudinal cross-sectional view, and FIG. 5 a transverse cross-sectional view taken along the plane 5—5 of FIG. 1, to illustrate certain constructional details of the device.

Figure 2:
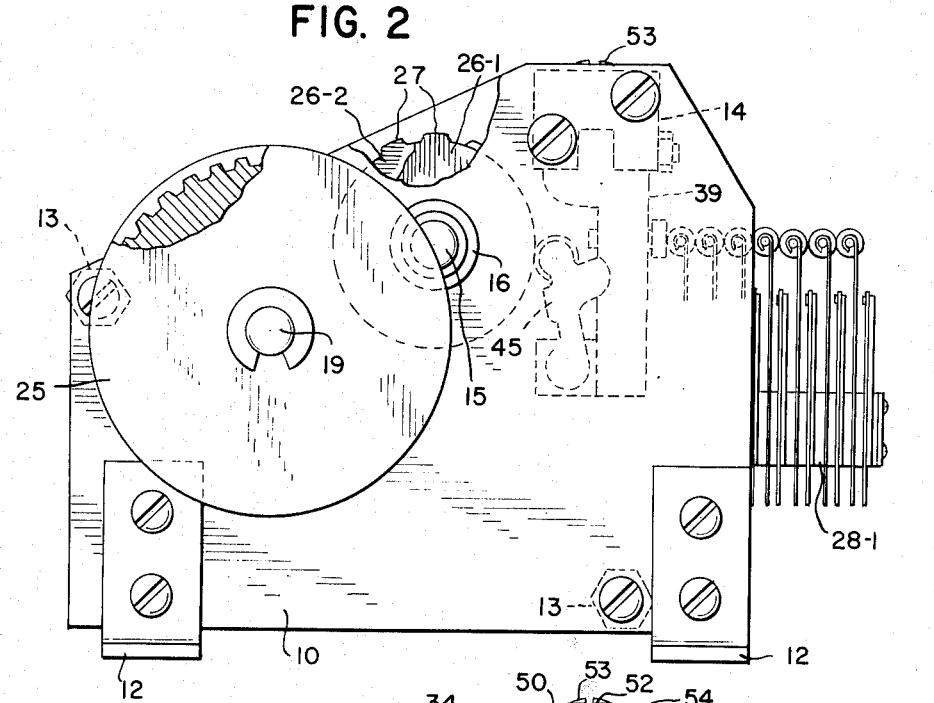

Referring now more particularly to FIG. 1, the electrical system sequential-circuit controller of the present invention is assembled between side plates 10 and 11 having mounting feet 12 and maintained in spaced relation by two spacer rods 13 conveniently of hexagonal cross section and by a spacer bar 14 of rectangular cross section. A shaft 15 is journalled for rotation in bearings 16 provided in the plates 10 and 11, and has secured to it at one end a gear 17 which meshes with a gear 18 mounted upon and secured to a shaft 19. The latter is rotationally journalled at one end by a bearing 20 provided in the plate 11 and is rotationally journalled at its other end in a clutch 21 mounted in an aperture of the plate 10. The shaft 15 is longitudinally fixed in position by engagement of the bearing 16 by the hub of the gear 17 and by a collar 22 secured on the end of the shaft 15, and the shaft 19 is similarly fixed in longitudinal position by engagement with the bearing 20 of the hub of the gear 18 and by a collar 23 secured on the end of the shaft 19.

The clutch 21 is of the electromagnetically controlled helical spring wire clutch type, and may have a construction generally disclosed and described in the Blodgett U.S. Patent No. 2,927,158 as modified along the lines illustrated in the copending application of Harold F. Stiffler, Serial No. 249,201, filed January 3, 1963, entitled "Time Clock" and assigned to the same assignee as the present application. This clutch is of the 360° type, and thus mechanically connects the shaft 19 to a drive pulley 25 for one complete revolution of the latter following each short interval of energization of the electromagnets of the clutch. The pulley 25 is mechanically connected by a belt (not shown) to a source of driving power (also not shown), and preferably includes a transversely grooved belt engaging surface as shown for use with a conventional transversely ribbed belt to avoid belt slippage.

As shown more clearly by the cross-sectional view of FIG. 4, a plurality of cam elements 26–1–26–15 are fixedly secured in longitudinally spaced relation on the shaft 15. These cam elements may be fabricated as individual cam members as illustrated for the cam element 26–1 or may be fabricated in cam-element groups as a multi-element cam member as illustrated for the cam element 26–2–26–8 and 26–9–26–15. These cam elements are provided with individual cam lobe segments, for example a single projecting cam lobe 27 as more clearly shown in FIG. 2. For sequential circuit control during each of successive equally spaced time intervals, the lobe 27 of one cam element is angularly displaced by a predetermined angular increment from the cam lobe 27 of the adjacent cam element as illustrated in FIG. 2 for the cam elements 26–1 and 26–2. It is usually convenient, and often preferable, to select the angular increment of relative cam-lobe displacement such that the angular increment multiplied by the total number of single-lobe cam elements is equal to 360° so that the axial median plane of the cam lobes becomes coincident with a horizontal plane rearwardly projecting from the shaft 15 at successive equally spaced time intervals during each complete revolution of the shaft 15 at constant velocity. Each of the cam elements 26–1–26–15 operates an individual one of a plurality of electrical contact assemblies 28–1–28–15 which are fixedly supported on the spacer bar 14 and have a construction presently to be described more fully. As illustrated diagrammatically in FIG. 1, these contact assemblies may have different numbers of electrical contacts with respect to one another and thus may be of different size according to each particular application. Also according to the application, each may have one or more normally open contacts or one or more normally closed contacts or both normally open and normally closed contacts or may even include one or more sets of transfer electrical contacts wherein the movable transfer contact moves between a normally closed and a normally open fixed contact.

Figure 5:
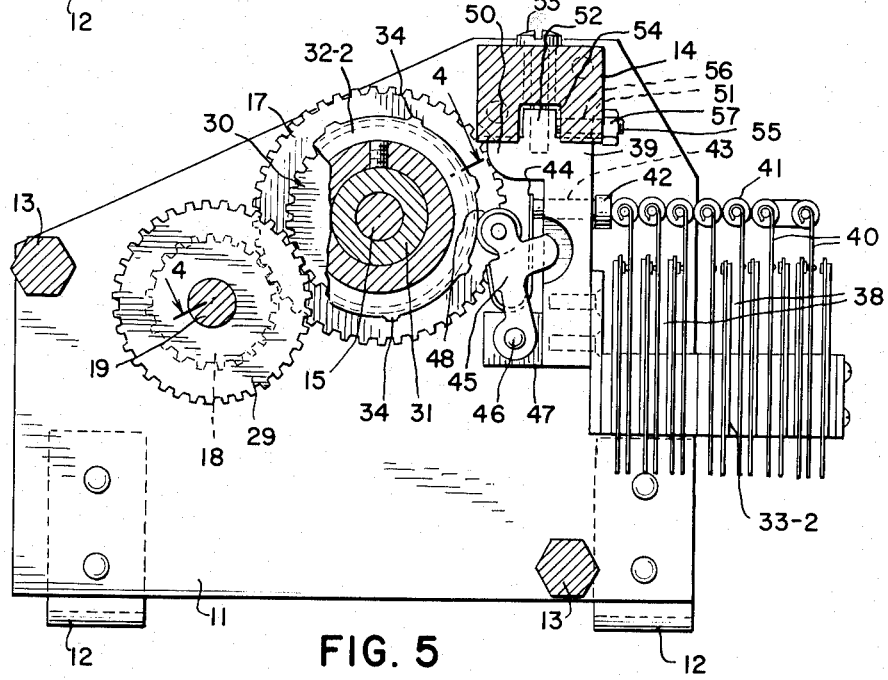

Formed integrally with the gear 18 is a gear 29 which is positioned in meshed engagement with a gear 30 journalled for rotation on the shaft 15 by an elongated gear hub 31. Fixedly supported upon the gear hub 31 for rotation therewith are three cam elements 32–1–32–3, of which the cam element 32–1 has a single projecting cam lobe (not particularly shown) angularly positioned to operate an associated contact assembly 33–1 at the position which the cam element 32–1 occupies when the driven shaft 19 is mechanically disconnected from the drive pulley 25 by the clutch 21. This cam element and its associated contact assembly are used in conjunction with the operation of the contact assembly 28–15 by the cam element 26–15 for cyclic control of the energization of the clutch electromagnets in a manner presently to be explained. The cam element 32–2 operates an associated contact assembly 33–2, and is provided with a succession of projecting cam lobes 34 displaced at equal angles around the periphery of the cam element 32–2 as illustrated in FIG. 5. The cam element 32–3 operates an associated contact assembly 33–3, and likewise is provided with a succession of projecting cam lobes having equal angular displacements around the periphery of the cam element 32–3. For reasons presently to be explained more fully, the angular displacement between the lobes of the cam elements 32–2 and 32–3 has a value twice the angular displacement of the lobes 27 of adjacent ones of the cam elements 26–1–26–14. Further, the ratio of the gears 17 and 18 is selected such that the shaft 19 makes two complete revolutions for each complete revolution of the shaft 15 whereas the ratio of the gears 29 and 30 is unity so that the cam elements 32–1–32–3 make one complete revolution for each revolution of the shaft 19. Thus the contact assemblies 33–2 and 33–3 are operated each time that the contact assemblies 28–1–28–14 are operated in succession by the cam elements 26–1–26–14.

All of the contact assemblies 28–1–28–15 and 33–1–33–3 are fixedly supported in spaced relation upon the spacer bar 14 and have the general construction illustrated in FIG. 5 for the contact assembly 33–2. Each contact assembly includes one or more electrical contacts 38 supported in stacked relation on a support member 39 and with the several movable contacts 40 exerting a spring bias force through inter-engaging rollers 41 of insulated material against a plunger 42 supported for reciprocal movement in an aperture 43 of the support member 39. The plunger 43 is reciprocated by engagement with one end of a U-shaped leaf spring member 44 having its opposite end secured to a cam arm 45 pivoted on a shaft 46 supported by a projecting portion 47 of the support member 39. The cam lever 45 is provided at its free end with a pivoted cam roller 48 which is biased by the plunger 42 into engagement with the surface of the associated cam element, which for the contact assembly 33–2 is the cam element 32–2. Each cam lobe of the associated cam element thus effects clockwise pivotal motion of the cam arm 45 as seen in FIG. 5, and this pivotal motion through the leaf spring 44 reciprocates the plunger 42 to operate the movable contacts 40 of the electrical contacts 38. The support member 39 is provided with a transversely elongated foot portion 50 having its end received in transverse slots 51 formed in longitudinally spaced relation along the spacer bar 14. The foot portion 50 has an extended portion 52 which is secured by a machine screw 53 within a longitudinal slot 54 of the spacer bar 14. A set screw 55 is received in a threaded aperture 56 to enable radial adjustment of the contact assembly with respect to the axis of the shaft 15 prior to the securing of the assembly to the spacer bar 14 by final tightening of the machine screw 53, the adjusted position of the set screw 55 being secured by a lock nut 57 threaded on the set screw and tightened against the spacer bar 14. The several contact assemblies, while having the general construction just described, may differ as previously mentioned with respect to the number of electrical contacts provided in each and with respect to the nature of the contacts whether of the normally open or normally closed types or of the transfer contact type.

Figure 6:
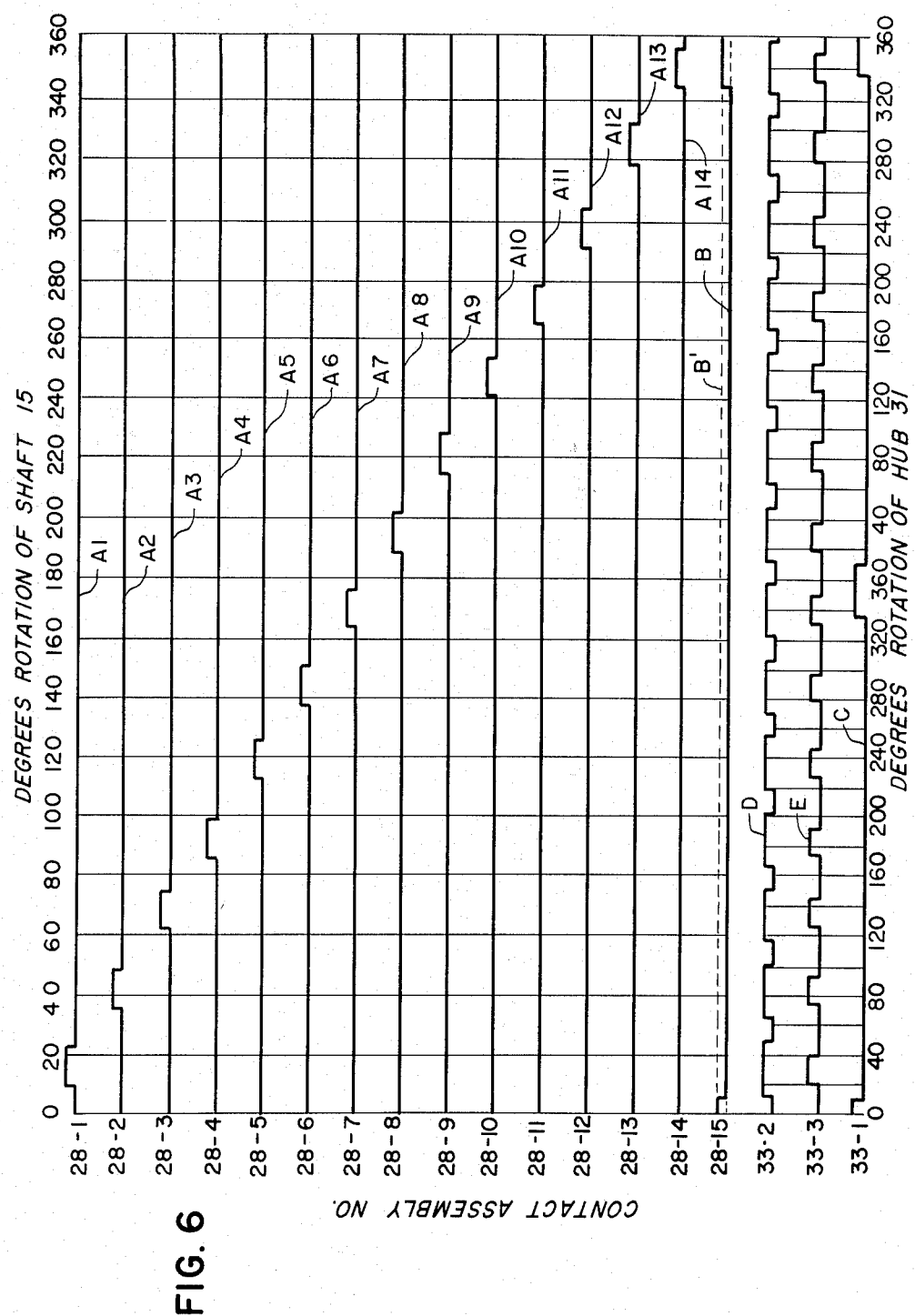
FIG. 6 graphically illustrates certain operational characteristics of the device and is used as an aid in explaining its operation.

A typical sequential-circuit controller embodying the invention may have cam element lobe configurations and relative angular displacements providing a character of controller operation graphically shown in FIG. 6, although it will be understood that the resulting operational characteristics are intended to present only an illustrative example suitable for a particular application. Curves A–1–A–14 of FIG. 6 graphically indicate the angular range of operation of the respective contact assemblies 28–1–28–14 with rotation of the shaft 15 starting from its 0 or "home" position of rest, prior to electrical energization of the magnets of the clutch 21, and continuing through a complete 360° angular rotation where the shaft is once more brought to rest by operation of the clutch 21. It will be seen that each of curves A–1–A–14 includes a short plateau of approximately 12° angular length rising from a base line, the plateau indicating the angular range over which normally open contacts are operated to normally closed contact position (or if the contact assembly includes normally closed contacts, the range over which the contacts are operated from normally closed to normally open contact position). It will be seen that the plateau of the successive curves A–1–A–14 have equal angular displacements with respect to the plateau of adjacent curves, and that the plateaus are evenly distributed throughout a complete revolution of the shaft 15. Curve B represents the angular interval of operation of the contact assembly 28–15, and it will be seen that the contacts of this assembly are operated from approximately 345° of one rotation of the shaft 15 to approximately 5° of the succeeding rotation of the shaft and thus are operated at the "home" or 0° position of the shaft. The solid line curve B represents the operation of open contacts to normally closed positions at 0° and 360° as indicated by the plateaus of the curve, and broken curve line B′ represents the operation of normally open contacts at 0° and 360° operated to closed contact position.

It was earlier explained that the shaft 19 makes two complete revolutions for each complete revolution of the shaft 15. To accomplish two complete revolutions of the shaft 19 following each initial energization of the electromagnet of the clutch 21, normally open contacts are provided on the contact assembly 33–1 and these are operated to closed contact position as indicated by the plateaus of curve C from approximately 335° of one rotation of the gear hub 31 to approximately 10° of the succeeding revolution of the hub 31. The electromagnets of the clutch 21 are now energized from a suitable source of energization (not shown) through a series circuit which includes the normally open contacts provided on the contact assembly 33–1 as last mentioned and through normally open home contacts provided in the contact assembly 28–15 and operated as represented by the broken line curve B′. Thus upon completion of the first revolution of the shaft 19, the clutch electromagnets are once more energized through now closed contacts of the contact assemblies 28–15 and 33–1 connected in series between the electromagnets and the energizing source just mentioned. This effects energization of the clutch electromagnets after each complete revolution of the shaft 19 but not at the completion of the second revolution of this shaft at which time the energizing circuit is interrupted by the normally open contacts of the contact assembly 28–15.

Curve D of FIG. 6 represents the angular intervals of the gear hub 31 during which normally open contacts of the contact assembly 33–2 are operated to closed-contact position (or alternatively when normally closed contacts of this contact assembly are operated to open contact position). It will be noted that the contacts of the contact assembly 33–2 are thus operated concurrently with operation of each of the contact sub-assemblies 28–1–28–14 and accordingly are suitable for controlled energization of electrical relays utilized in an electrical control system having multiple control circuits sequentially controlled by the contact assemblies 28–1–28–14. Curve E of FIG. 6 represents the angular intervals of operation of the contact assembly 33–3 wherein normally open contacts are operated to closed contact position represented by the plateaus of curve E. It will be noted that these contacts are operated to closed-contact position concurrently with and intermediate the angular interval of operation of the contact assemblies 28–1–28–14. The contacts of the contact assembly 33–3 may accordingly supply electrical energization to all of the contact assemblies 28–1–28–14 in common, or a stack of contacts provided in the contact assembly 33–3 may have a contact pair included in an electrical circuit in series with individual ones of the contacts or contact pairs of the contact assemblies 28–1–28–14. The higher rotational velocity of the cam element 32–3, which operates the contact assembly 33–3, provides in a compact physical construction a more precise timing of electrical circuit control than is readily provided by the more slowly rotating cam elements associated with the contact assemblies 28–1–28–14.

Electrical energization supplied through a pair of contacts of the contact assemblies 33–2 or 33–3 provides a form of electrical pulse generator providing output-circuit pulses of constant periodicity throughout each revolution of the associated cam element 32–2 or 32–3 and having a pulse duration and an inter-pulse interval controlled by the lobe configuration of the element. Similarly, electrical energization supplied through a pair of contacts of each of the contact assemblies 28–1–28–14 also provides a form of constant-periodicity electrical pulse generator but in this case the successive electrical-energy pulses are available as single pulses in fourteen independent output circuits.

It will be apparent from the foregoing description of the invention that a sequential-circuit controller embodying the invention is of the mechanically operated type having a relatively sturdy and inexpensive construction yet is one having high precision of sequential operational control and unusually high operational reliability over prolonged periods of operation requiring little or no maintenance attention. The present sequential-circuit controller enables concise control with ease of relatively large numbers of electrical circuits individually or as included in each of sequentially controlled multiple groups of circuits. The controller construction enables the use of contact assemblies utilizing relatively light-weight contacts having movable contacts with minimized mass, thus enabling very rapid contact operation between contact-closed and contact-open positions with resultant rapidity and precision of circuit control action and minimized contact arching even when used with control circuits having significant inherent inductance.

While a specific form of the invention has been described for purposes of illustration, it is contemplated that numerous changes may be made without departing from the spirit of the invention.

I claim:

1. An electrical sequential-circuit controller comprising a shaft, support means for rotationally supporting said shaft, a plurality of cam elements fixedly secured in longitudinally spaced relation on said shaft and each including a cam lobe which for each element is angularly displaced by a preselected uniform value of angular increment from the cam lobe of an adjacent element, a cam element rotatably supported on said shaft and including on its periphery plural cam lobes equally spaced by an angular increment having a value bearing an integral ratio to said preselected angular increment, a plurality of electrical contact assemblies supported by said support means for operational actuation by individual ones of said cam elements, means mechanically coupling said shaft and said rotatably supported cam element for rotations at relative velocities having said integral ratio, and cycle-control means adapted drivingly to rotate said shaft through complete cyclic rotations thereof and controllably to halt said shaft upon completion of each said cyclic rotation.

2. An electrical sequential-circuit controller comprising support means providing spaced opposed walls and a shaft rotationally supported thereby, a plurality of cam elements fixedly secured in longitudinally spaced relation on said shaft and including cam lobes which with respect to each element are angularly displaced by a preselected angular increment from the cam lobe of an adjacent element, a cam element rotationally supported on said shaft and including plural cam lobes, a plurality of electrical contact assemblies supported by said support means for operational actuation by individual ones of said cam elements, and cycle-control drive means adapted drivingly to rotate said shaft and said rotatably supported cam element at differing angular velocities and through complete cyclic rotations thereof and controllably to halt said shaft and said rotatably supported cam element at the completion of a cyclic rotation of both thereof.

3. An electrical sequential-circuit controller comprising support means providing spaced opposed walls and a shaft rotationally supported thereby, a plurality of cam elements fixed secured in longitudinally spaced relation on said shaft and including cam lobes which with respect to each element are angularly displaced by a preselected angular increment from the cam lobe of an adjacent element, a cam element rotationally supported on said shaft and including plural cam lobes equally spaced around the periphery thereof by an angular spacing value equal to twice said angular increment, a plurality of electrical contact assemblies supported by said support means for operational actuation by individual ones of said cam elements, and cycle-control means adapted drivingly to rotate said shaft at preselected angular velocity and said rotatably supported cam element at twice said angular velocity through complete cyclic rotations thereof and controllably to halt said shaft and said rotatably supported cam element at the completion of a cyclic rotation thereof.

4. An electrical sequential-circuit controller comprising support means providing spaced opposed walls, a first shaft rotationally supported by said support means, a plurality of cam elements fixedly secured in longitudinally spaced relation on said shaft and including cam lobes which with respect to each element are angularly displaced by a preselected angular increment from the cam lobe of an adjacent element, a cam element rotationally supported on said shaft and including plural cam lobes equally spaced around the periphery thereof by an angular spacing value equal to twice said angular increment, a plurality of electrical contact assemblies supported by said support means for operational actuation by individual ones of said cam elements, a second shaft rotationally supported by said support means in parallel spaced relation to said first shaft, means for mechanically driving said first shaft at preselected angular velocity from said second shaft and for mechanically driving said rotationally supported cam element at twice said preselected angular velocity from said second shaft, and cycle-control means on said second shaft and adapted drivingly to rotate said second shaft through angles corresponding to complete cyclic rotations of said first shaft and controllably to halt said second shaft at angles corresponding to the completion of each said cyclic rotation.

5. An electrical sequential-circuit controller comprising support means providing spaced opposed walls, a shaft rotationally supported by said support means, a first gear element and a plurality of cam elements fixedly secured in longitudinally spaced relation on said shaft and including cam lobes which with respect to each element are angularly displaced by a preselected angular increment from the cam lobe of an adjacent element, a second gear element rotationally supported on said shaft and at least one cam element mechanically connected to said second gear element for rotation therewith, a plurality of electrical contact assemblies supported by said support means for operational actuation by individual ones of said cam elements, and means including cycle-control means and gear elements drivingly engaging said first and second gear elements for drivingly rotating said shaft and second gear element at different angular velocities through complete cylic rotations thereof and for controllably halting said shaft at the completion of each said cyclic rotation.

6. An electrical sequential-circuit controller comprising first and second shafts, support means for rotationally supporting said shafts in spaced parallel relation, a first gear element and a plurality of cam elements fixedly secured in longitudinally spaced relation on said first shaft and including a cycle-control cam element having a cam lobe defining a cyclic halt position of said first shaft, a second gear element and mechanically integral cam elements including a cycle-control cam element rotationally supported on said first shaft, a plurality of electrical contact assemblies fixedly supported by said support means for operational actuation by individual ones of said cam elements, gear means on said second shaft for drivingly engaging said first and second gear elements drivingly to rotate said first shaft and said second gear element at different angular velocities having an integral velocity ratio, and electrically controlled cycle-control means on said second shaft and adapted to be jointly energized by electrical contacts actuated by said cycle-control cam elements for continuing each rotation cycle of said first shaft to a controllable halt at said halt position thereof.

7. An electrical sequential-circuit controller comprising first and second shafts, support means for rotationally supporting said shafts in spaced parallel relation, a first gear element and a plurality of cam elements fixedly secured in longitudinally spaced relation on said first shaft and including a cycle-control cam element having a cam lobe defining a cyclic halt position of said first shaft and sequence control cams having sequence lobes successively angularly displaced by a preselected angular increment, a second gear element rotationally supported by an elongated hub on said first shaft, cam elements fixedly secured on said hub and including a single-lobe cycle-control cam element and control cam elements each having plural lobes angularly displaced by twice said angular displacement, a plurality of electrical contact assemblies fixedly supported by said support means for operational actuation by individual ones of said cam elements, gear means on said second shaft for drivingly engaging said first and second gear elements drivingly to rotate said first shaft at a preselected angular velocity and said second gear element at twice said angular velocity, and an electrically controlled cycle-control clutch on said second shaft and adapted to be jointly energized by electrical contacts actuated by said cycle-control cam elements for continuing each rotation cycle of said first shaft to a controllable halt at said halt position thereof.

8. An electrical sequential-circuit controller comprising a shaft, support means for rotationally supporting said shaft, a first gear element and a plurality of cam elements fixedly secured in longitudinally spaced relation on said shaft and including sequence-control cam elements and a cycle-control cam element having a cam lobe defining a cyclic halt position of said first shaft, a second gear element and mechanically integral cam elements including multilobe cam elements and a cycle-control cam element rotationally supported on said first shaft, a plurality of electrical contact assemblies fixedly supported by said support means for operational actuation by individual ones of said cam elements, gear means for drivingly engaging said first and second gear elements drivingly to rotate said first shaft and said second gear element at different angular velocities having an integral velocity ratio, and an electrically controlled helical wire spring clutch adapted to effect rotational drive of said first shaft by cyclic energization supplied serially through electrical contacts actuated by said cycle-control cam elements to continue each rotation cycle of said first shaft to a controllable halt at said halt position thereof.

9. An electrical sequential-circuit controller comprising first and second shafts, support means for rotationally supporting said shafts in spaced parallel relation, a first gear element and a plurality of cam elements fixedly secured in longitudinally spaced relation on said first shaft and including a cycle-control cam having a cam lobe defining a cyclic halt position of said first shaft, a second gear element and mechanically integral cam elements including a cycle-control cam element rotationally supported on said first shaft, a plurality of electrical contact assemblies fixedly supported by said support means for operational actuation by individual ones of said cam elements, gear means on said second shaft for drivingly engaging said first and second gear elements drivingly to rotate said first shaft and said second gear element at different angular velocities having an integral velocity ratio, and an electrically controlled helical wire spring clutch on said second shaft for controlled mechanical rotational drive thereof and adapted to be jointly energized by electrical contacts actuated by said cycle-control cam elements for continuing each rotation cycle of said first shaft to a controllable halt at said halt position thereof.

10. An electrical sequential-circuit controller comprising support means providing spaced opposed walls, a first and a second shaft rotationally supported in spaced parallel relation by said support means, a first gear element and a plurality of cam elements fixedly secured in longitudinally spaced relation on said first shaft and including cam lobes which with respect to each element are angularly displaced by a preselected angular increment from the cam lobe of an adjacent element, a cycle-control cam element fixedly secured on said first shaft and having a cam lobe defining a cyclic halt position of said first shaft, a second gear element rotationally supported on said first shaft and cam elements including a cycle-control cam element mechanically connected to said second gear element for rotation therewith, a plurality of electrical contact assemblies fixedly supported in spaced relation by said support means and including individual contact-actuating cam followers engaging individual ones of said cam elements, plural gear elements fixedly secured on said second shaft and engaging said first and second gear elements for drivingly rotating said first shaft and said second gear element at different angular velocities having an integral velocity ratio, and electrically controlled cycle-control means on said second shaft and adapted to be cyclically energized by conjoint operations of electrical contacts cam-follower actuated by said cycle-control cam elements for rotating said first shaft through complete cyclic rotations thereof and for controllably halting said first shaft at said halt position thereof.

References Cited by the Examiner

UNITED STATES PATENTS 2,359,059  9/44  Somes.
2,526,628  10/50  Belock.
2,943,161  6/60  Fath.

References Cited by the Applicant

UNITED STATES PATENTS 3,073,928  1/63  Olsson.

BERNARD A. GILHEANY, *Primary Examiner*.
ROBERT K. SCHAEFER, *Examiner*.